(12) United States Patent
Keck (10) Patent No.: US 10,208,816 B2
(45) Date of Patent: Feb. 19, 2019

(54) ANTI-REVERSE ROTATION APPARATUSES, ROTORS FOR USE THEREIN, AND RELATED METHODS

(71) Applicant: TECO-WESTINGHOUSE MOTOR COMPANY, Round Rock, TX (US)

(72) Inventor: James A. Keck, Round Rock, TX (US)

(73) Assignee: TECO-WESTINGHOUSE MOTOR COMPANY, Round Rock, TX (US)

( * ) Notice: Subject to any disclaimer, the term of this patent is extended or adjusted under 35 U.S.C. 154(b) by 128 days.

(21) Appl. No.: 15/603,064

(22) Filed: May 23, 2017

(65) Prior Publication Data

US 2018/0340582 A1 Nov. 29, 2018

(51) Int. Cl.
| | |
|---|---|
| *F16D 51/26* | (2006.01) |
| *F16D 51/60* | (2006.01) |
| *F16D 65/09* | (2006.01) |
| *F01D 21/00* | (2006.01) |
| *F04D 29/22* | (2006.01) |
| *F16D 127/10* | (2012.01) |
| *F16D 125/58* | (2012.01) |

(52) U.S. Cl.
CPC ............ *F16D 51/60* (2013.01); *F01D 21/006* (2013.01); *F04D 29/2261* (2013.01); *F16D 51/26* (2013.01); *F16D 65/09* (2013.01); *F05D 2260/902* (2013.01); *F16D 2125/582* (2013.01); *F16D 2127/10* (2013.01)

(58) Field of Classification Search
CPC .......... F16D 51/60; F16D 51/26; F16D 65/09; F16D 2125/582; F16D 2127/10; F16D 2127/004; F16D 2127/002; F16D 2127/005; F01D 21/006; F04D 29/2261; F05D 2260/9002
See application file for complete search history.

(56) References Cited

U.S. PATENT DOCUMENTS

| | | |
|---|---|---|
| 1,845,684 A | 2/1932 | Starkey |
| 2,477,176 A | 7/1949 | Gruenberg et al. |
| 2,896,912 A | 7/1959 | Faugier et al. |
| 3,393,781 A | 7/1968 | Miura |
| 3,448,308 A | 6/1969 | Pervorse et al. |
| 3,498,429 A | 3/1970 | Frakes |
| 3,539,844 A | 11/1970 | Linn |
| 4,582,179 A | 4/1986 | Nelson |
| 4,718,617 A | 1/1988 | Vadasz et al. |

(Continued)

*Primary Examiner* — Thomas W Irvin
(74) *Attorney, Agent, or Firm* — Norton Rose Fulbright US LLP (57) ABSTRACT

This disclosure includes anti-reverse rotation apparatuses, rotors for use therein, and related methods. Some apparatuses include a stator defining an interior volume and one or more arcuate contact surfaces within the interior volume, and a rotor rotatably coupled to the stator and at least partially disposed within the interior volume, the rotor having a hub, two or more shoes, each pivotally coupled to the hub and extending between a first end and a second end that is farther from the hub than is the first end, wherein each of the shoes is rotatable relative to the hub between: (a) a first position in which the second end of the shoe contacts at least one of the arcuate contact surface(s) of the stator; and (b) a second position in which the second end of the shoe does not contact the arcuate contact surface(s) of the stator.

20 Claims, 9 Drawing Sheets

(56) References Cited

U.S. PATENT DOCUMENTS

| | | | |
|---|---|---|---|
| 5,419,504 A | 5/1995 | Miyazaki et al. | |
| 5,551,510 A * | 9/1996 | Mills | E21B 43/126 |
| | | | 166/68 |
| 9,027,717 B2 | 5/2015 | Hult | |
| 9,334,908 B2 * | 5/2016 | Tickner | F16D 51/22 |
| 2006/0278484 A1 * | 12/2006 | Antolovic | F16D 51/04 |
| | | | 188/323 |
| 2018/0180116 A1 * | 6/2018 | Hsu | F16D 49/20 |

* cited by examiner

ANTI-REVERSE ROTATION APPARATUSES, ROTORS FOR USE THEREIN, AND RELATED METHODS

BACKGROUND

1. Field of Invention

The present invention relates to apparatuses for restricting reverse rotation of a rotating component of a device (e.g., a rotor of a motor) relative to a stationary component of the device (e.g., a stator of the motor) and related methods.

2. Description of Related Art

In many instances, it is desirable to restrict rotation of a rotatable component of a device in a first direction ("reverse rotation"), while permitting rotation of the rotatable component in a second direction that is opposite to the first direction. For instance, reverse rotation of the rotatable component may not produce useful work, may cause damage to the device, and/or may be dangerous. Such devices can include, for example, motors, generators, pumps, compressors, transmissions, drive shafts, and/or the like.

To illustrate, an example of such a device is a centrifugal pump, having an impeller as its rotatable component. During use, if power to the impeller is lost, fluid pressure upstream of the pump can encourage reverse rotation of the impeller. If this reverse rotation is not restricted, the impeller (as well as any components that rotate with the impeller) may reach speeds that exceed design limitations, potentially damaging the pump as well as endangering nearby personnel.

Some apparatuses for restricting reverse rotation include a pawl, disposed on one of a rotatable component and a stationary component, that rides on a series of structures (e.g., teeth, pockets, pins, or the like) disposed on the other of the components. The pawl and the structures can be positioned and shaped such that relative movement of the pawl and the structures is permitted in one direction, but is restricted in an opposing direction.

Such apparatuses may suffer from a number of drawbacks. For example, depending on the orientation of the apparatus, gravity may discourage engagement between the pawl and the structures. Additionally, as a result of continuous contact between the pawl and the structures, such apparatuses may be prone to wear and/or be undesirably noisy. Such apparatuses also tend to be costly, due, at least in part, to their complexity.

Other apparatuses for restricting reverse rotation can include a series of elements (e.g., sprags, rollers, or the like) that are disposed between and in contact with each of a pair of races, one of which is coupled to a rotatable component and the other of which is coupled to a stationary component. In such apparatuses, the races and elements can be shaped such that relative rotation of the races—and thus the components—in a first direction is restricted via wedging of the elements between the races, and relative rotation of the races in a second direction that is opposite to the first direction is permitted via sliding of the elements along at least one of the races.

However, such apparatuses typically require a high degree of concentricity between the races; otherwise, excessive wear, undesirable binding, and/or the like may occur. This requirement can complicate the use of such apparatuses to restrict reverse rotation of rotatable components that whirl, exhibit run-out, and/or the like, such as, for example, those that are supported by hydrodynamic bearings. Additionally, such apparatuses may be prone to wear due to, for example, continuous contact between the elements and the races. As with the apparatuses described above, such apparatuses can be relatively complex and costly.

SUMMARY

Some of the present rotors for use in an anti-reverse rotation device comprise: a hub including two or more first stops, and two or more shoes, each pivotally coupled to the hub and extending between a first end and a second end that is farther from the hub than is the first end, wherein each of the shoes is rotatable relative to the hub between a first position in which the shoe contacts at least a portion of a respective one of the first stops and a second position in which the shoe does not contact the portion of the respective first stop, and wherein, when the rotor is rotatably coupled to and at least partially disposed within a stator, the second end of each of the shoes contacts the stator when the shoe is in the first position to restrict rotation of the rotor relative to the stator in a first direction through contact with the stator and the respective first stop, the second end of each of the shoes does not contact the stator when the shoe is in the second position, and rotation of the rotor relative to the stator in a second direction that is opposite to the first direction urges each of the shoes toward the second position. In some rotors, the hub includes two or more second stops, and each of the shoes contacts a respective one of the second stops when the shoe is in the second position.

In some rotors, the hub defines two or more recesses, each of the shoes is at least partially disposed within a respective one of the recesses, and, optionally, each of the recesses defines a respective one of the first stops. In some rotors, each of the recesses defines a respective one of the second stops.

In some rotors, each of the shoes is biased toward the first position, and, optionally, the rotor comprises two or more springs, each disposed between the hub and a respective one of the shoes to bias the shoe toward the first position. In some rotors, the center of gravity of each of the shoes is circumferentially offset in the second direction from an axis of rotation of the shoe relative to the hub.

In some rotors, for each of the shoes, a portion of the shoe that contacts the respective first stop is disposed closer to a longitudinal axis of the hub than is an axis of rotation of the shoe relative to the hub. In some rotors, for each of the shoes, a first radial distance from an axis of rotation of the shoe relative to the hub to an outermost surface of the second end of the shoe is at least four times a second radial distance from the axis to an outermost surface of the first end of the shoe, and the first and second radial distances are measured when the shoe is in the second position.

In some rotors, each of the shoes is pivotally coupled to the hub by a respective pin. In some rotors, for each of the shoes, one of the shoe and the hub defines a respective slot, and the respective pin is received within the respective slot such that the shoe is radially-translatable relative to the hub. In some rotors, for each of the shoes, as the shoe moves from the first position and toward the second position, the respective slot moves radially outwardly relative to the respective pin.

Some embodiments of the present anti-reverse rotation apparatuses comprise: a stator defining an interior volume and one or more arcuate contact surfaces within the interior volume, and a rotor rotatably coupled to the stator and at least partially disposed within the interior volume, the rotor comprising a hub and two or more shoes, each pivotally coupled to the hub and extending between a first end and a second end that is farther from the hub than is the first end, wherein each of the shoes is rotatable relative to the hub between a first position in which the second end of the shoe contacts at least one of the arcuate contact surface(s) of the stator and a second position in which the second end of the shoe does not contact the arcuate contact surface(s) of the stator, and wherein the hub includes two or more first stops, and each of the shoes contacts a respective one of the first stops when the shoe is in the first position, wherein, when each of the shoes is in the first position, the shoes restrict rotation of the rotor relative to the stator in a first direction through contact with the arcuate contact surface(s) of the stator and the first stops of the hub, and wherein rotation of the rotor relative to the stator in a second direction that is opposite to the first direction urges each of the shoes toward the second position. In some anti-reverse rotation apparatuses, the hub includes two or more second stops, and each of the shoes contacts a respective one of the second stops when the shoe is in the second position.

In some anti-reverse rotation apparatuses, the hub defines two or more recesses, each of the shoes is partially disposed within a respective one of the recesses, and, optionally, each of the recesses defines a respective one of the first stops. In some anti-reverse rotation apparatuses, each of the recesses defines a respective one of the second stops.

In some anti-reverse rotation apparatuses, each of the shoes is biased toward the first position, and, optionally, the rotor comprises two or more springs, each disposed between the hub and a respective one of the shoes to bias the shoe toward the first position. In some anti-reverse rotation apparatuses, the center of gravity of each of the shoes is circumferentially offset in the second direction from an axis of rotation of the shoe relative to the hub.

In some anti-reverse rotation apparatuses, for each of the shoes, a portion of the shoe that contacts the respective first stop is disposed closer to a longitudinal axis of the hub than is an axis of rotation of the shoe relative to the hub. In some anti-reverse rotation apparatuses, for each of the shoes, a first radial distance from an axis of rotation of the shoe relative to the hub to an outermost surface of the second end of the shoe is at least 4 times a second radial distance from the axis to an outermost surface of the first end of the shoe, and the first and second radial distances are measured when the shoe is in the second position.

In some anti-reverse rotation apparatuses, each of the shoes is pivotally coupled to the hub by a respective pin. In some anti-reverse rotation apparatuses, for each of the shoes, one of the shoe and the hub defines a respective slot, and the respective pin is received within the respective slot such that the shoe is radially-translatable relative to the hub. In some anti-reverse rotation apparatuses, for each of the shoes, as the shoe moves from the first position and toward the second position, the respective slot moves radially outwardly relative to the respective pin.

In some anti-reverse rotation apparatuses, the stator includes an annular groove within the interior volume, the groove having an outer face and an opposing inner face, and each of the shoes includes a plate that extends between the first and second ends of the shoe and a protrusion that extends outwardly from the plate at the second end and is received by the groove, wherein the protrusion contacts the outer face and/or the inner face of the groove when the shoe is in the first position.

Some embodiments of the present methods comprise: rotating a rotor relative to and within a stator, the rotor having a hub including two or more first stops and two or more shoes, each pivotally coupled to the hub and extending between a first end and a second end that is farther from the hub than is the first end, wherein the rotating is performed such that each of the shoes rotates relative to the hub from a first position in which the shoe is in contact with at least a portion of a respective one of the first stops and the second end of the shoe is in contact with the stator and toward a second position in which the shoe does not contact the portion of the respective first stop and the second end of the shoe does not contact the stator. In some methods, the hub includes two or more second stops, and each of the shoes contacts a respective one of the second stops when the shoe is in the second position.

In some methods, the hub defines two or more recesses, each of the shoes is partially disposed within a respective one of the recesses, and, optionally, each of the recesses defines a respective one of the first stops. In some methods, each of the recesses defines a respective one of the second stops.

In some methods, each of the shoes is biased toward the first position, and, optionally, the rotor comprises two or more springs, each disposed between the hub and a respective one of the shoes to bias the shoe toward the first position. In some methods, the center of gravity of each of the shoes is circumferentially offset in the direction of rotation of the rotor relative to the stator from an axis of rotation of the shoe relative to the hub.

In some methods, for each of the shoes, a portion of the shoe that contacts the respective first stop is disposed closer to a longitudinal axis of the hub than is an axis of rotation of the shoe relative to the hub. In some methods, for each of the shoes, a first radial distance from an axis of rotation of the shoe relative to the hub to an outermost surface of the second end of the shoe is at least 4 times a second radial distance from the axis to an outermost surface of the first end of the shoe, and the first and second radial distances are measured when the shoe is in the second position.

In some methods, each of the shoes is pivotally coupled to the hub by a respective pin. In some methods, for each of the shoes, one of the shoe and the hub defines a respective slot, and the respective pin is received within the respective slot such that the shoe is radially-translatable relative to the hub. In some methods, for each of the shoes, as the shoe moves from the first position and toward the second position, the respective slot moves radially outwardly relative to the respective pin.

In some methods, the stator includes an annular groove having an outer face and an opposing inner face, and each of the shoes includes a plate that extends between the first and second ends of the shoe and a protrusion that extends outwardly from the plate at the second end and is received by the groove, wherein the protrusion contacts at least one of the outer face and the inner face of the groove when the shoe is in the first position.

The term "coupled" is defined as connected, although not necessarily directly, and not necessarily mechanically; two items that are "coupled" may be unitary with each other. The terms "a" and "an" are defined as one or more unless this disclosure explicitly requires otherwise.

The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus that "comprises," "has," or "includes" one or more elements possesses those one or more elements, but is not limited to possessing only those one or more elements. Likewise, a method that "comprises," "has," or "includes," one or more steps possesses those one or more steps, but is not limited to possessing only those one or more steps.

Any embodiment of any of the apparatuses, systems, and methods can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Further, an apparatus or system that is configured in a certain way is configured in at least that way, but it can also be configured in other ways than those specifically described.

Some details associated with the embodiments are described above, and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiment depicted in the figures.

DETAILED DESCRIPTION

Figure 1A:
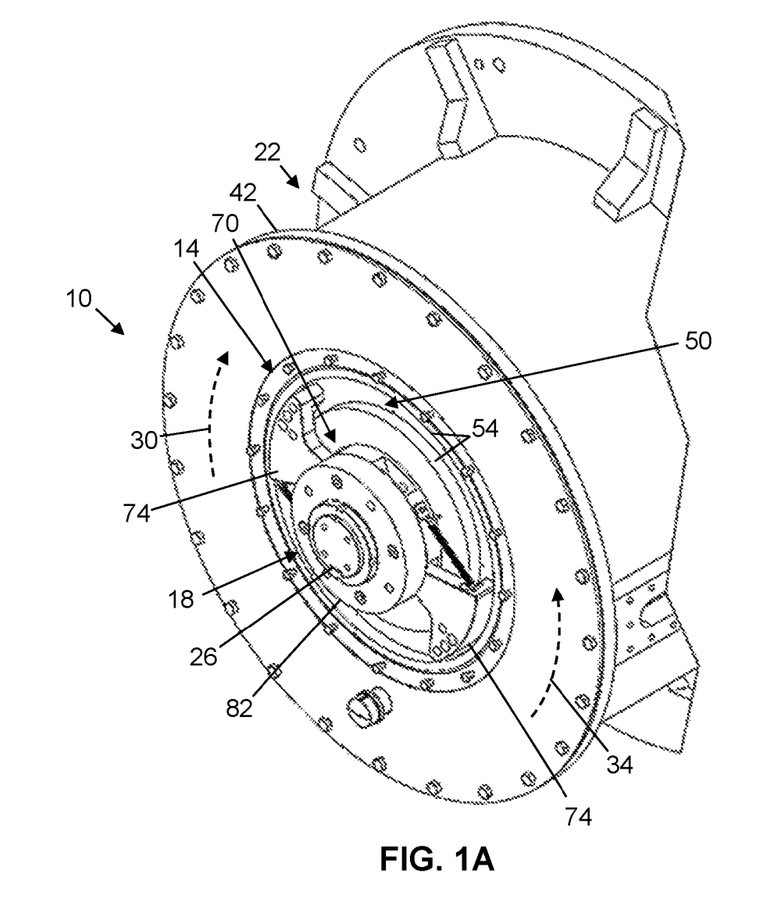
FIG. 1A is a perspective view of one embodiment of the present anti-reverse rotation apparatuses.
Figure 1B:
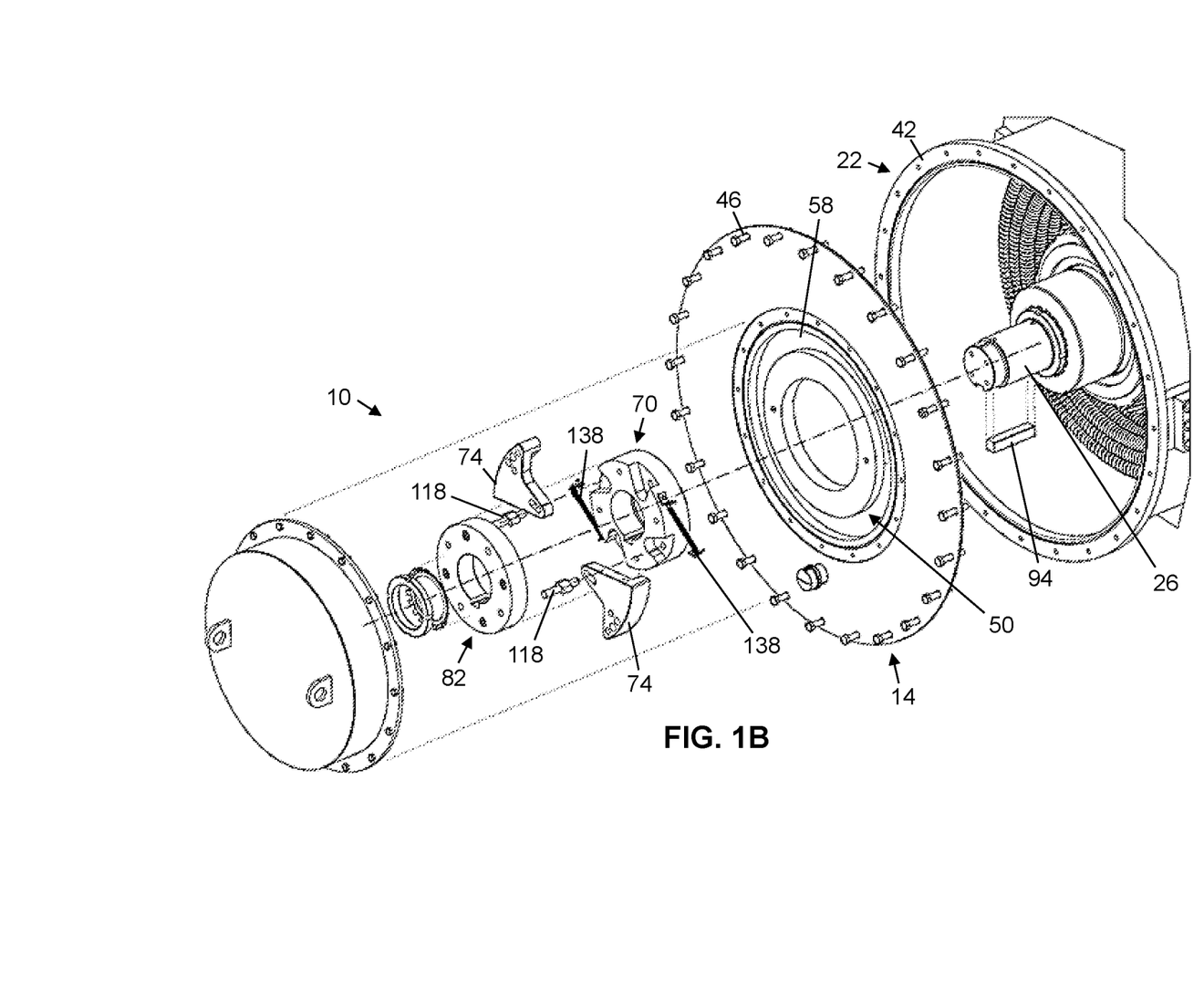
FIG. 1B is an exploded view of the apparatus of FIG. 1A.

FIGS. 1A and 1B depict an embodiment 10 of the present anti-reverse rotation apparatuses. Apparatus 10 includes a stator 14 and a rotor 18 that is rotatable relative to the stator. As described below, apparatus 10 is configured to restrict rotation of rotor 18 relative to stator 14 in a first direction 30 and to permit rotation of the rotor relative to the stator in a second direction 34 that is opposite to the first direction. In this way, stator 14 can be coupled to (or form part of) a first component of a device and rotor 18 can be coupled to (or form part of) a second component of the device that is rotatable relative to the first component to thereby restrict rotation of the second component relative to the first component in first direction 30, but permit such rotation in second direction 34. As shown, apparatus 10 is coupled to a motor 22, with rotor 18 coupled to a shaft 26 of the motor and stator 14 coupled to a body 42 (e.g., a housing) of the motor. Nevertheless, the present apparatuses can be coupled to any suitable device, such as, for example, a generator, a pump, a compressor, a transmission, a drive shaft, and/or the like. As used herein, "stator" refers to a component relative to which a rotor is rotatable; a "stator" can, but need not, comprise or be coupled to a part of a motor or a generator or be stationary.

Figure 2A:
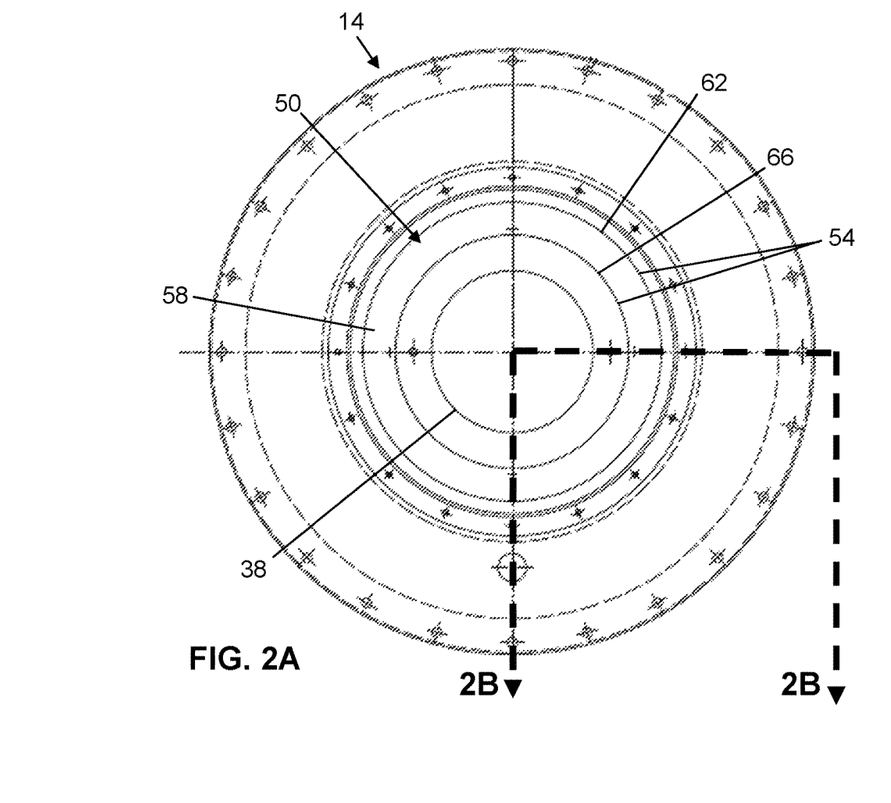
FIG. 2A is a top view of a stator that is suitable for use in some of the present apparatuses.
Figure 2B:
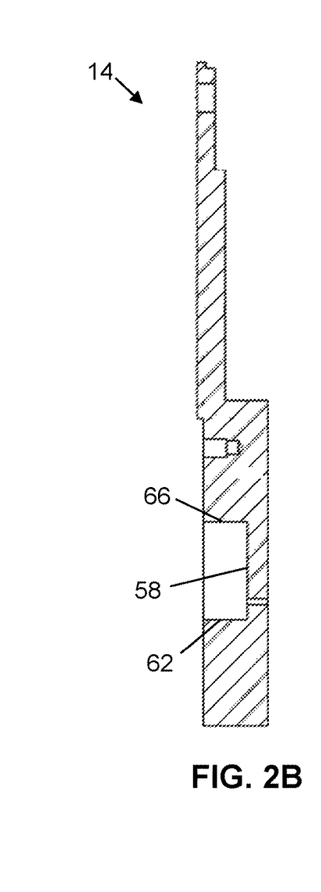
FIG. 2B is an enlarged cross-sectional side view of the stator of FIG. 2A, taken along line 2B-2B of FIG. 2A.

Referring additionally to FIGS. 2A and 2B, stator 14 can comprise a plate having an opening 38 extending through the plate, the opening being sized to receive shaft 26. Opening 38 of stator 14 can have any suitable transverse cross-sectional shape (e.g., square, triangular, or otherwise polygonal, circular, elliptical, or otherwise rounded). In this embodiment, stator 14 can be rotationally fixed relative to body 42 of motor 22 by one or more fasteners 46 (FIG. 1B) (e.g., pin(s), rivet(s), bolt(s), screw(s), and/or the like) such that shaft 26 is rotatable relative to the stator.

In this embodiment, stator 14 defines an interior volume 50, which, as described below, is configured to receive at least a portion of rotor 18. Stator 14 can include one or more arcuate contact surfaces 54 within interior volume 50. For example, stator 14 can include an annular groove 58 within interior volume 50, the groove having an outer face 62 and an opposing inner face 66, each of which can include one of arcuate contact surface(s) 54. In this embodiment, each of arcuate contact surface(s) 54 is cylindrical; however, in other embodiments, one or more arcuate contact surfaces can be conical, ellipsoidal, or the like.

Figure 3A:
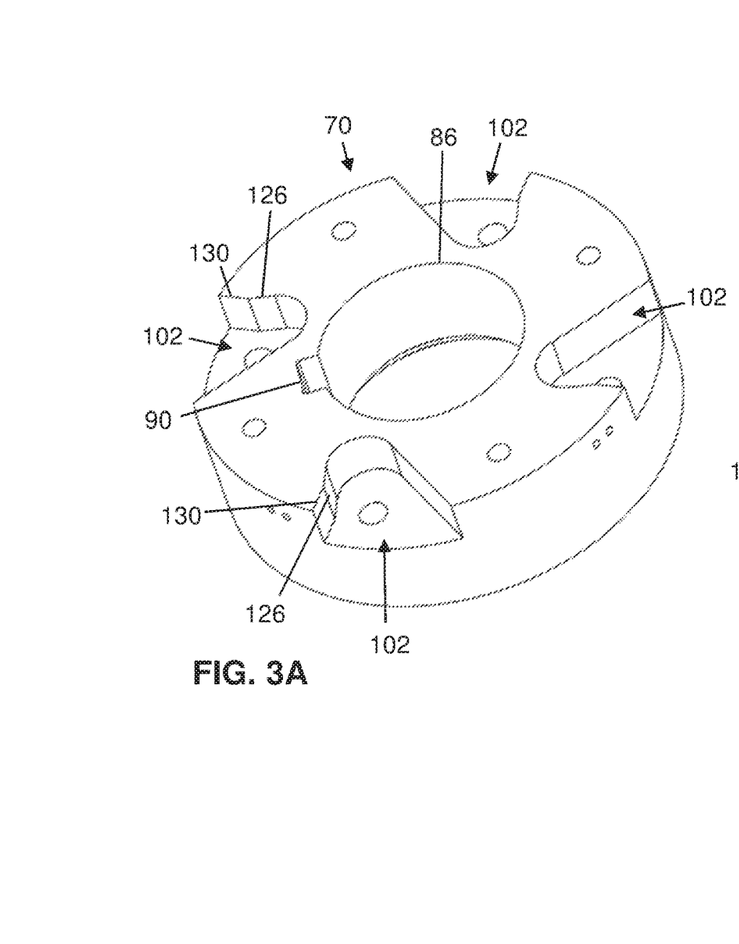
FIG. 3A is a perspective view of a hub that is suitable for use in some of the present apparatuses.
Figure 3B:
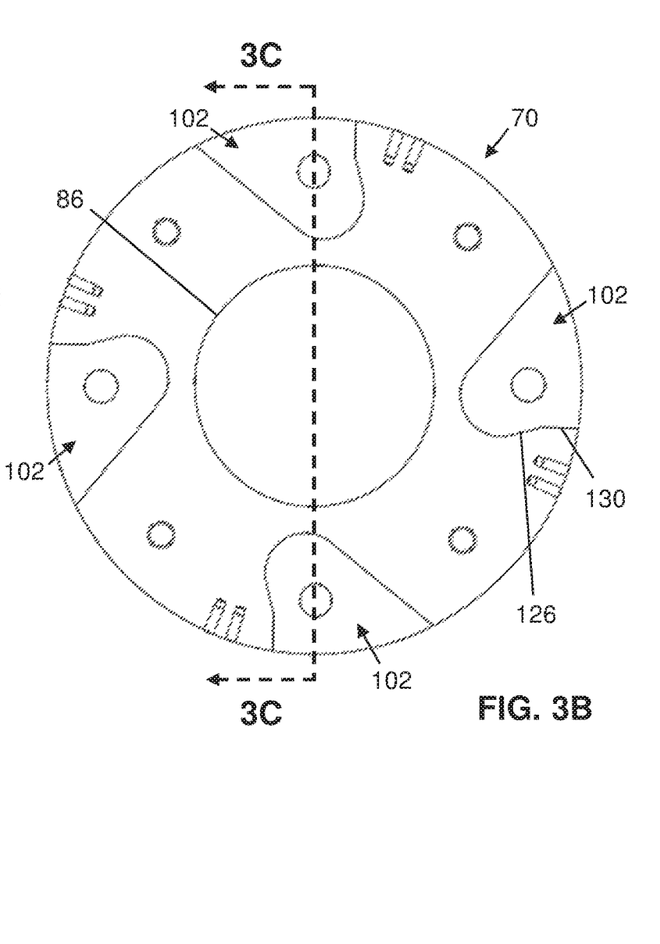
FIG. 3B is a top view of the hub of FIG. 3A.
Figure 3C:
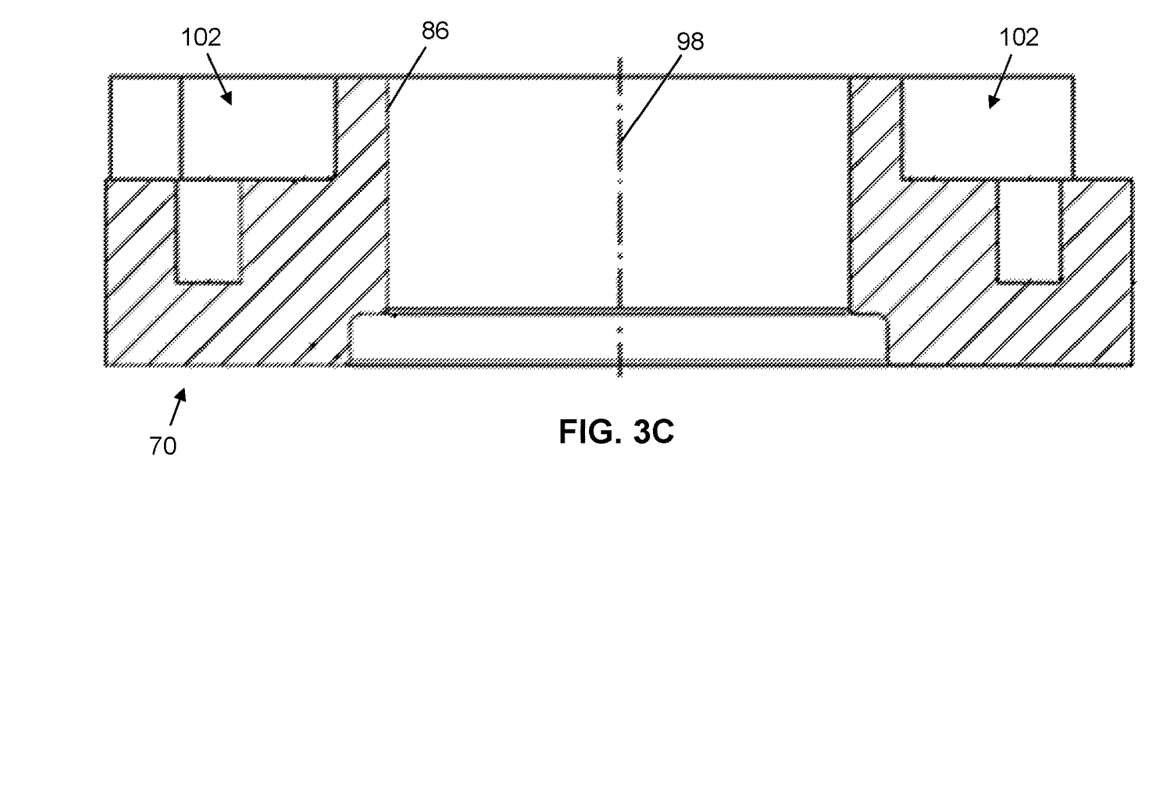
FIG. 3C is a cross-sectional side view of the hub of FIG. 3A, taken along line 3C-3C of FIG. 3B.

Rotor 18 comprises a hub 70 and two or more shoes 74. Referring additionally to FIGS. 3A-3C, hub 70 can comprise a plate having an opening 86 extending through the plate. Opening 86 can be sized to receive shaft 26. In particular, opening 86 of hub 70 can include a transverse cross-sectional shape corresponding to a cross-sectional shape of shaft 26. For example, opening 86 and shaft 26 can each include a transverse cross-sectional shape that is square, triangular, or otherwise polygonal, circular, elliptical, or otherwise rounded. Opening 86 of hub 70 can include a recess 90 configured to receive a protrusion 94 (e.g., a key) on shaft 26 such that the hub is rotationally fixed relative to the shaft. As shown, hub 70 includes a longitudinal axis 98 extending through opening 86. Longitudinal axis 98 defines an axis of rotation of rotor 18 relative to stator 14.

Hub 70 can include two or more recesses 102. Each of shoes 74 can be partially disposed within a respective one of recesses 102. As described below, each of recesses 102 of hub 70 is configured to allow rotational and/or translational movement of a respective shoe 74. Rotor 18 can include an end plate 82 that is fastenable to hub 70 to secure shoes 74 between the end plate and the hub.

Referring additionally to FIGS. 4A-4D, apparatus 10 can comprise any suitable number of shoes 74, such as, for example, 2, 3, 4, 5, or more shoes. The number of shoes 74 used in apparatus 10 can be selected considering a reverse holding torque (e.g., a torque required to prevent reverse rotation of rotor 18 relative to stator 14). For example, the greater the reverse holding torque required for an apparatus (e.g., 10), the more shoes 74 that the apparatus can comprise. Each of shoes 74 can be pivotally coupled to hub 70. More particularly, each of shoes 74 can be pivotally coupled to hub 70 by a respective pin 118. Each pin 118 includes a longitudinal axis 122 that defines an axis of rotation of a respective shoe 74 relative to hub 70.

Figure 4A:
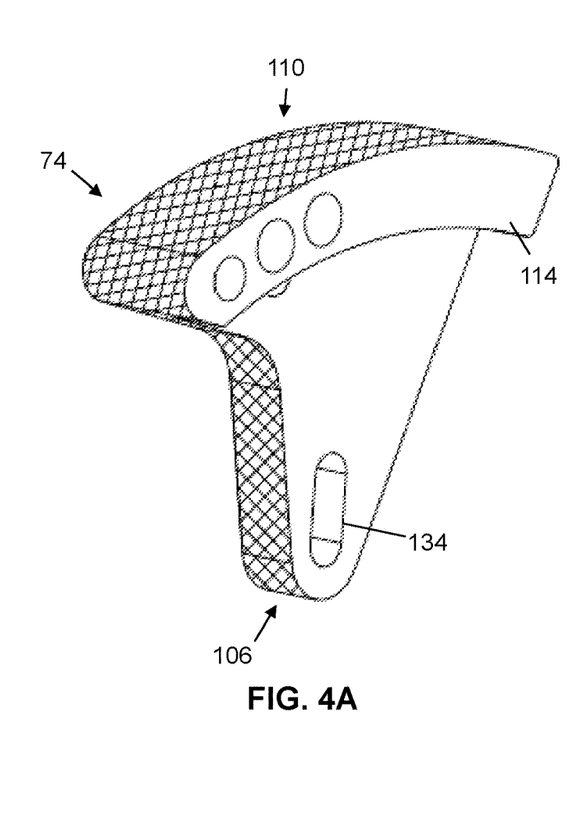
FIG. 4A is a perspective view of a shoe that is suitable for use in some of the present apparatuses.
Figure 4B:
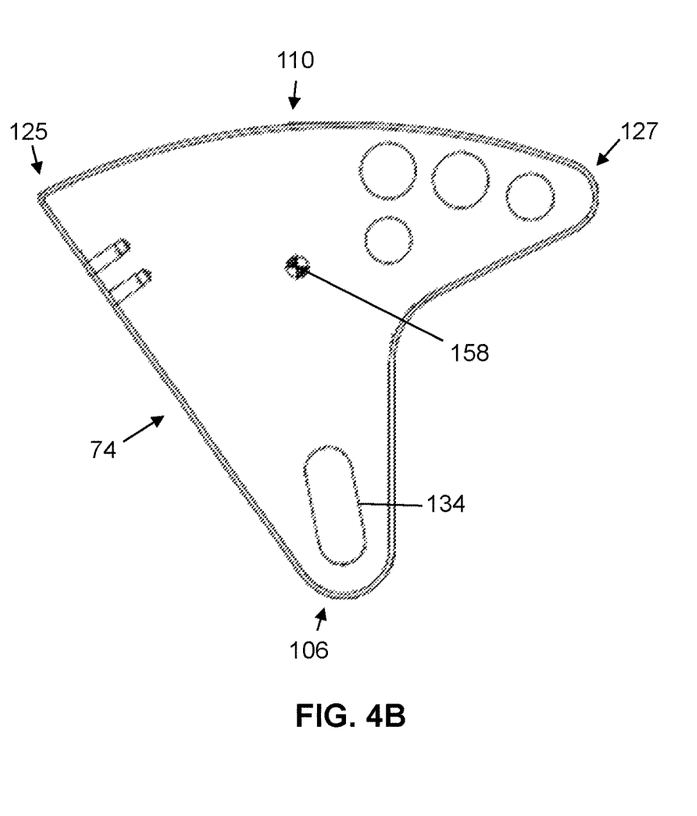
FIGS. 4B-4D are top and opposing side views, respectively, of the shoe of FIG. 4A.
Figure 4C:
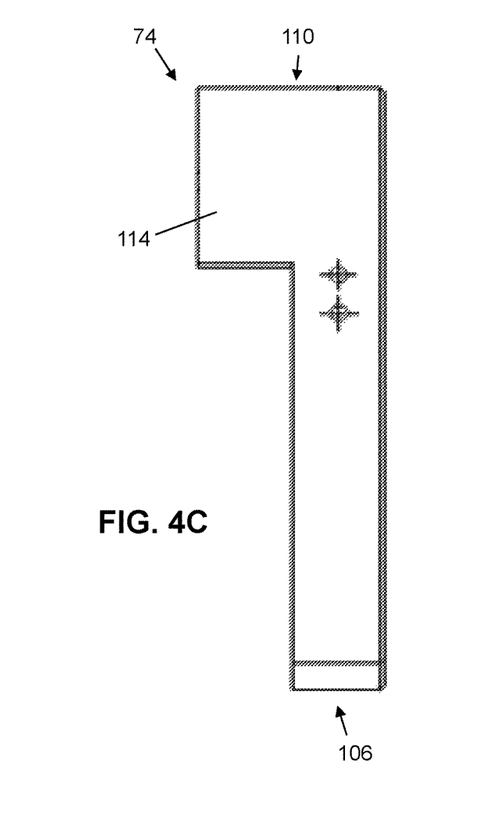
Figure 4D:
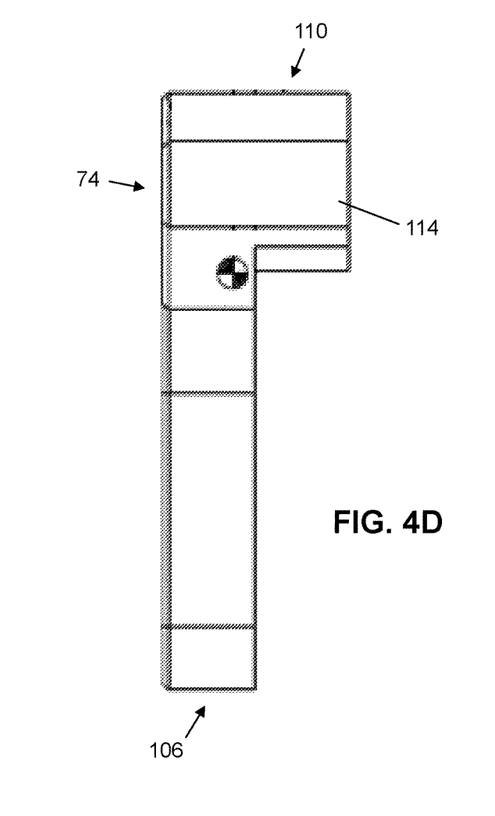

Each of shoes 74 can extend between a first end 106 and a second end 110 that, when the shoe is coupled to hub 70, is farther from longitudinal axis 98 of hub 70 than is the first end. Each of shoes 74 can include a plate that extends between first end 106 and second end 110. Each of shoes 74 can include a protrusion 114 extending from its plate at second end 110. Rotor 18 can be coupled to shaft 26 of motor 22 such that the rotor is at least partially disposed within interior volume 50 of stator 14, and, more particularly, such that protrusion 114 of each of shoes 74 extends into groove 58 of the stator (FIG. 1A).

Figure 5A:
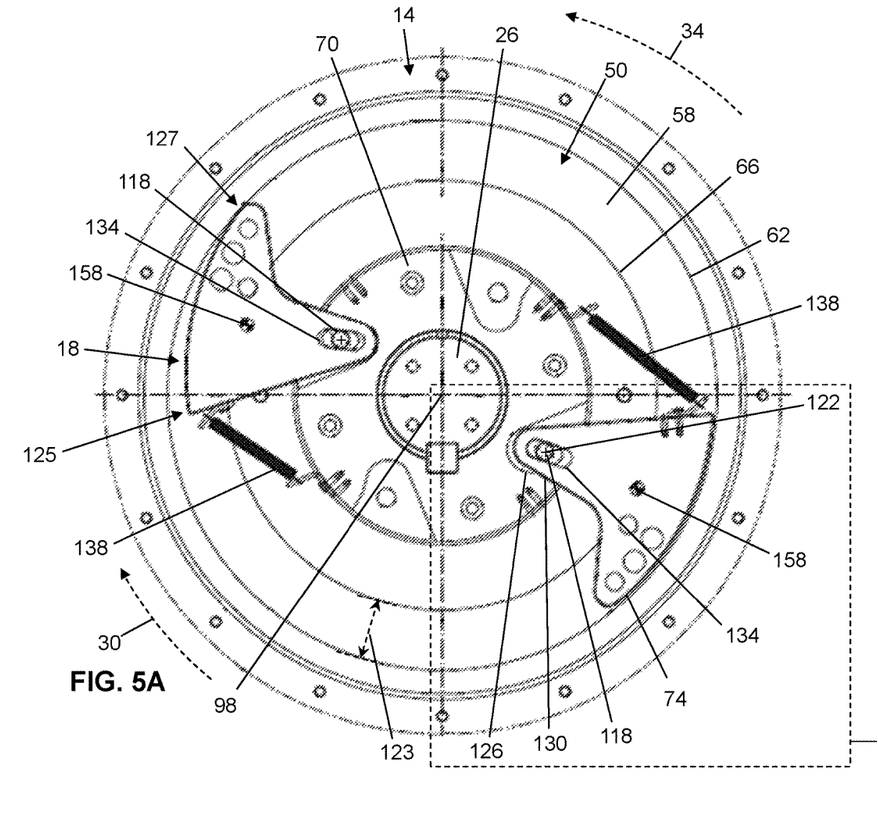
FIG. 5A is a top view of the apparatus of FIG. 1A.

Each of shoes 74 is rotatable relative to hub 70 between a first position (the position of the shoe on the left side of FIG. 5A) and a second position (the position of the shoe on the right side of FIG. 5A). As will be described below, for each of shoes 74, when the shoe is in the first position, the shoe restricts rotation of rotor 18 relative to stator 14 in first direction 30, and, when the shoe is in either the first position or the second position, the shoe permits rotation of rotor 18 relative to stator 14 in second direction 34.

For each of shoes 74, when the shoe is in the first position, second end 110 of the shoe can contact one or more of arcuate contact surface(s) 54 of stator 14, and more particularly, outer face 62 and/or inner face 66 of groove 58. In this way, frictional force(s) between the shoe and stator 14 resist rotation of rotor 18 relative to the stator in first direction 30, which can be enhanced, in some instances, by such frictional force(s) causing wedging of the shoe between hub 70 and the stator and/or within groove 58 of the stator. In some apparatuses, such frictional force(s) can be facilitated by a friction material of stator 14 that defines at least a portion of one or more of its arcuate contact surface(s) 54 (e.g., at least a portion of outer face 62 and/or inner face 66) and/or a friction material of each of shoes 74 that is located such that the friction material contacts the stator when the shoe contacts the stator (e.g., such that the friction material defines at least a portion of outermost surface 146 of second end 110 of the shoe, at least a portion of an outermost and/or innermost surface of protrusion 114 of the shoe, and/or the like). Such a friction material can comprise any suitable friction material, including, for example, a metallic, organic, ceramic, and/or the like friction material. In some apparatuses, portion(s) of shoes 74 and/or stator 14 where contact between the shoes and the stator occurs can comprise a material selected to mitigate the generation of sparks, such as, for example, aluminum.

To facilitate such functionality, hub 70 can include two or more first stops 126, each configured to restrict rotation of a respective one of shoes 74 relative to the hub beyond the first position (i.e., rotation of the shoe relative to the hub from the first position in second direction 34). To illustrate, for each of shoes 74, the shoe can be rotated relative to hub 70 in second direction 34 until the shoe reaches the first position and is in contact with at least a portion of a respective first stop 126. The shoe, as it is moved from the first position in first direction 30, may move out of contact with the portion of the first stop. In this embodiment, for each of shoes 74, a portion of the shoe that contacts the first stop is disposed closer to longitudinal axis 98 of hub 70 than is an axis of rotation of the shoe relative to the hub (e.g., longitudinal axis 122 of its respective pin 118). When a shoe is in the first position, due to contact between the shoe and stator 14, rotation of rotor 18 relative to stator 14 in first direction 30 can urge the shoe to rotate relative to hub 70 in second direction 34; a first stop, by restricting such rotation, can maintain contact between the shoe and the stator.

In apparatus 10, for each of shoes 74, when the shoe is in the first position, the shoe contacts outer face 62 of groove 58. In addition to creating friction between the shoe and stator 14, such contact can cause the shoe to be wedged (e.g., compressed) between outer face 62 and its respective pin 118, first stop 126, and/or recess 102, further restricting rotation of rotor 18 relative to stator 14 in first direction 30. Such wedging can be enhanced by radial translation of the shoe relative to hub 70, as described below.

In some apparatuses, protrusion 114 of each of shoes 74 and/or groove 58 of stator 14 can be dimensioned such that, when the shoe is in the first position, its protrusion contacts inner face 66 of the groove. Such contact can be achieved by, for example, selecting a width 123 of groove 58 and/or a corresponding dimension of protrusions 114. More particularly, in some apparatuses, each of shoes 74 can contact inner face 66 of stator 14 at an inner surface of protrusion 114 at a leading end 125 of the shoe. In this way, such contact, in addition to creating friction between the shoe and stator 14, can cause the shoe to be tensioned between its leading end 125 and its respective pin 118, further restricting rotation of rotor 18 relative to the stator in first direction 30. In some apparatuses, depending on the dimensions of protrusions 114 and groove 58, the shoes can be wedged between inner face 66 and outer face 62 of the groove when the shoes are in the first position. In some apparatuses, contact between inner face 66 and a shoe 74 can serve as a back-up for restricting rotation of rotor 18 relative to stator 14 in first direction 30 in the event that, for example, outer face 62 and/or the portion of the shoe that contacts the outer face (e.g., trailing end 127 of the shoe) undesirably deforms (e.g., yields).

For each of shoes 74, when the shoe is in the second position, the shoe, or at least second end 110 thereof, does not contact stator 14, or at least arcuate contact surface(s) 54 thereof. More particularly, shoes 74 may contact neither outer face 62 nor inner face 66 of groove 58. Thus, when in the second position, shoes 74 can permit rotation of rotor 18 relative to stator 14 in second direction 34. Minimizing or eliminating such contact between shoes 74 and stator 14 can render apparatus 10 less prone to wear and/or less noisy. Furthermore, minimizing or eliminating such contact can create clearance between rotor 18 and stator 14, permitting a degree of shaft 26 run-out and/or whirl.

Hub 70 can include two or more second stops 130, each configured to restrict rotation of a respective one of shoes 74 relative to the hub beyond the second position (i.e., rotation of the shoe relative to the hub from the second position in first direction 30). To illustrate, for each of shoes 74, the shoe can be rotated relative to hub 70 in first direction 30 until the shoe reaches the second position and is in contact with at least a portion of a respective second stop. The shoe, as it is moved from the second position in second direction 34, may move out of contact with the portion of the second stop. A second stop 130, by restricting movement of a respective shoe 74 beyond the second position, can prevent undesirable contact between the shoe and stator 14.

A stop (e.g., a first stop 126 or a second stop 130) can comprise any suitable structure that is capable of limiting rotation of a shoe 74 by contacting the shoe, such as, for example, a protrusion (e.g., a pin), a surface (e.g., of a wall or recess), or the like. For example, in this embodiment, each of recesses 102 of hub 70—via its sidewall—defines a respective one of first stops 126 and a respective one of second stops 130. More particularly, the first stop and the second stop can be defined by the sidewall of the recess on a same side of the recess, with the portion of the sidewall that defines the first stop being angularly disposed relative to the portion of the sidewall that defines the second stop. In apparatus 10, stops (e.g., first stops 126 and second stops 130) are features of hub 70; however, in other apparatuses, such stops can be features of shoes 74. To illustrate, a first stop 126 or a second stop 130 can comprise a projection (e.g., a pin) that extends from a shoe 74 and contacts hub 70 when the shoe is in the first position or second position, respectively.

Each of shoes 74 can be radially-translatable relative to longitudinal axis 98 of hub 70; for example, one of the shoe and hub 70 can define a slot 134 configured to receive a pin 118 that couples the shoe to the hub such that the pin is movable relative to the slot. In at least this way, each slot 134 and pin 118 provides a respective shoe 74 clearance to move deeper into and farther out of a respective recess 102 as the shoe moves between the first and second positions. To illustrate, as the shoe moves from the second position toward the first position, the shoe can be received further into the recess, increasing contact area between the shoe and hub 70, bringing the shoe into contact with an inboard portion of the recess against which the shoe can be pressed, thereby facilitating wedging of the shoe between the hub and stator 14, and/or the like. To further illustrate, as the shoe moves from the first position toward the second position, the shoe can move farther out of the recess.

Each of shoes 74 can be biased toward the first position. For example, rotor 18 can comprise two or more springs 138 (e.g., compression springs, tension springs, torsion springs, and/or the like), each configured to bias a respective shoe 74 toward the first position. Each of springs 138 can be disposed between hub 70 and a respective shoe 74 (e.g., second end 110 thereof) to bias the shoe toward the first position. More particularly, each of springs 138 can be disposed between hub 70 and a respective shoe 74 so as to urge the shoe to rotate about its pin 118 to a position in which the shoe contacts a respective first stop 126 and/or stator 14 (e.g., at one or more of arcuate contact surface(s) 54, such as, for example outer face 62 and/or inner face 66 of groove 58). In this embodiment, each of springs 138 exerts a tension force on a respective shoe 74 to bias the shoe toward the first position. In other embodiments, one or more springs (e.g., 138) can be disposed between a hub (e.g., 70) and a respective shoe (e.g., 74) such that the one or more springs exert a compressive force on the shoe to bias the shoe toward the first position.

Figure 5B:
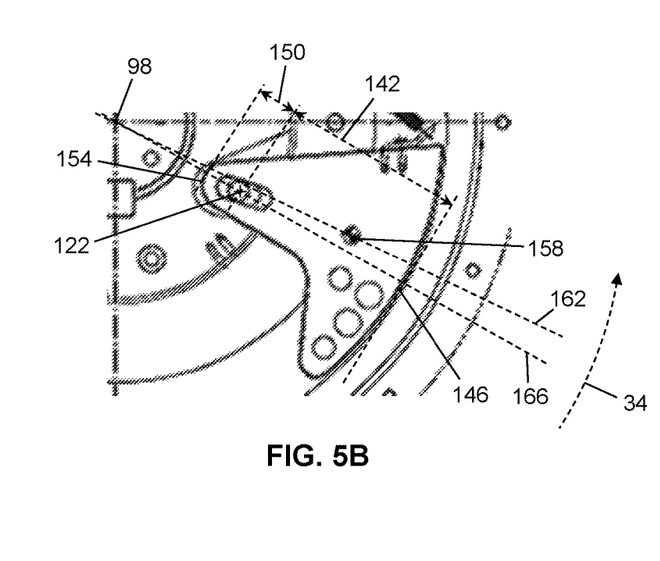
FIG. 5B depicts an enlarged portion of FIG. 5A.

Each of shoes 74 can be sized such that a first radial distance 142, measured from an axis of rotation of the shoe relative to hub 70 (e.g., longitudinal axis 122 of its pin 118) to an outermost surface 146 of second end 110 of the shoe (e.g., along a line extending through the longitudinal axis of the pin and longitudinal axis 98 of the hub), is at least four (4) times longer (e.g., 4, 5, 6, 7, or more times longer) than a second radial distance 150, measured from the axis of rotation of the shoe relative to the hub to an outermost surface 154 of first end 106 of the shoe (e.g., along a line extending through the longitudinal axis of the pin and the longitudinal axis of the hub) (FIG. 5B). First radial distance 142 and second radial distance 150 can be measured when shoe 74 is in the second position.

Each of shoes 74 includes a center of gravity 158 that is circumferentially offset in second direction 34 from an axis of rotation of the shoe relative to hub 70 (e.g., longitudinal axis 122 of its pin 118). For example, for each of shoes 74, a line 162 that extends between longitudinal axis 98 of hub 70 and center of gravity 158 can be angularly disposed relative to a line 166 that extends between the longitudinal axis of the hub and longitudinal axis 122 of its respective pin 118. Center of gravity 158 of each of shoes 74 can be circumferentially offset in this way when the shoe is in the first position and/or the second position.

Rotation of rotor 18 relative to stator 14 in second direction 34 urges each of shoes 74 toward the second position. For example, rotation of rotor 18 relative to stator 14 in second direction 34 allows a centrifugal force (e.g., directed radially outwards from longitudinal axis 98 of hub 70) to act on each of shoes 74, thereby counteracting the biasing force of a respective spring 138 and rotating the shoe about its respective pin 118 in first direction 30 (e.g., due to the position of the shoe's center of gravity 158 relative to longitudinal axis 122 of pin 118 and longitudinal axis 98 of hub 70, as described above). Such a centrifugal force causes each of shoes 74 to rotate in first direction 30 about its respective pin 118 until the shoe contacts a respective second stop 130, which restricts additional rotational movement of the shoe in the first direction. Such a centrifugal force may cause each of slots 134 to move radially outwardly relative to a respective pin 118 until the pin reaches a closed end of the slot, thereby restricting additional translational movement of a respective shoe 74 in a radial direction away from longitudinal axis 98 of hub 70.

A deceleration of rotation of rotor 18 relative to stator 14 (e.g., due to failure of and/or loss of power to motor 22) reduces a centrifugal force acting on each of shoes 74 such that the biasing force of a respective spring 138 overcomes the centrifugal force and causes the shoe to rotate about its respective pin 118 in second direction 34. The reduction or absence of centrifugal force acting on each of shoes 74 and/or the biasing force provided by a respective spring 138 may cause a respective slot 134 to move radially inwardly relative to a respective pin 118 until first end 106 of the shoe contacts an innermost portion of a respective recess 102, thereby restricting translational movement of the shoe in a radial direction toward longitudinal axis 98 of hub 70. Once shoes 74 move to the first position, rotation of rotor 18 relative to stator 14 in first direction 30 is restricted as described above.

Some embodiments of the present methods comprise rotating a rotor (e.g., 18) relative to and within a stator (e.g., 14), the rotor having a hub (e.g., 70) including two or more first stops (e.g., 126) and two or more shoes (e.g., 74), each pivotally coupled to the hub and extending between a first end (e.g., 106) and a second end (e.g., 110) that is farther from the hub than is the first end, wherein the rotating is performed such that each of the shoes rotates relative to the hub: (a) from a first position in which the shoe is in contact with at least a portion of a respective one of the first stops and the second end of the shoe is in contact with the stator; and (b) toward a second position in which the shoe does not contact the portion of the respective first stop and the second end of the shoe does not contact the stator. In some methods, for each of the shoes, a portion of the shoe that contacts the respective first stop is disposed closer to a longitudinal axis (e.g., 98) of the hub than is an axis of rotation (e.g., 122) of the shoe relative to the hub. In some methods, the hub defines two or more recesses (e.g., 102), each of the shoes is partially disposed within a respective one of the recesses, and, optionally, each of the recesses defines a respective one of the first stops.

In some methods, the hub includes two or more second stops (e.g., 130), and each of the shoes contacts a respective one of the second stops when the shoe is in the second position. In some methods, each of the recesses defines a respective one of the second stops.

In some methods, each of the shoes is biased toward the first position, and optionally, the rotor comprises two or more springs (e.g., 138), each disposed between the hub and a respective one of the shoes to bias the shoe toward the first position. In some methods, the center of gravity (e.g., 158) of each of the shoes is circumferentially offset in the direction of rotation of the rotor relative to the stator from an axis of rotation (e.g., 122) of the shoe relative to the hub.

In some methods, for each of the shoes a first radial distance (e.g., 142) from an axis of rotation (e.g., 122) of the shoe relative to the hub to an outermost surface (e.g., 146) of the second end of the shoe is at least four times a second radial distance (e.g., 150) from the axis to an outermost surface (e.g., 154) of the first end of the shoe, and the first and second radial distances are measured when the shoe is in the second position.

In some methods, each of the shoes is pivotally coupled to the hub by a respective pin (e.g., 118). In some methods, for each of the shoes, one of the shoe and the hub defines a respective slot (e.g., 134), and the respective pin is received within the respective slot such that the shoe is radially-translatable relative to the hub. In some methods, for each of the shoes, as the shoe moves from the first position and toward the second position, the respective slot moves radially outwardly relative to the respective pin.

In some methods, the stator includes an annular groove (e.g., 58) having an outer face (e.g., 62) and an opposing inner face (e.g., 66), and each of the shoes includes a plate that extends between the first and second ends of the shoe and a protrusion (e.g., 114) that extends outwardly from the plate at the second end and is received by the groove, wherein the protrusion contacts the outer face and/or the inner face of the groove when the shoe is in the first position.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A rotor for use in an anti-reverse rotation apparatus, the rotor comprising:
a hub including two or more first stops; and
two or more shoes, each pivotally coupled to the hub and extending between a first end and a second end that is farther from the hub than is the first end;
wherein each of the shoes is rotatable relative to the hub between a first position in which the shoe contacts at least a portion of a respective one of the first stops and a second position in which the shoe does not contact the portion of the respective first stop; and
wherein, when the rotor is rotatably coupled to and at least partially disposed within a stator:
the second end of each of the shoes contacts the stator when the shoe is in the first position to restrict rotation of the rotor relative to the stator in a first direction through contact with the stator and the respective first stop;
the second end of each of the shoes does not contact the stator when the shoe is in the second position; and
rotation of the rotor relative to the stator in a second direction that is opposite to the first direction urges each of the shoes toward the second position.

2. The rotor of claim 1, wherein:
each of the shoes is biased toward the first position; and
optionally, the rotor comprises two or more springs, each disposed between the hub and a respective one of the shoes to bias the shoe toward the first position.

3. The rotor of claim 2, wherein, for each of the shoes, a portion of the shoe that contacts the respective first stop is disposed closer to a longitudinal axis of the hub than is an axis of rotation of the shoe relative to the hub.

4. The rotor of claim 3, wherein:
the hub defines two or more recesses;
each of the shoes is partially disposed within a respective one of the recesses; and
optionally, each of the recesses defines a respective one of the first stops.

5. The rotor of claim 4, wherein:
the hub includes two or more second stops; and
each of the shoes contacts a respective one of the second stops when the shoe is in the second position.

6. The rotor of claim 1, wherein, for each of the shoes:
a first radial distance from an axis of rotation of the shoe relative to the hub to an outermost surface of the second end of the shoe is at least four times a second radial distance from the axis to an outermost surface of the first end of the shoe; and
the first and second radial distances are measured when the shoe is in the second position.

7. An anti-reverse rotation apparatus comprising:
a stator defining:
an interior volume; and
one or more arcuate contact surfaces within the interior volume; and
a rotor rotatably coupled to the stator and at least partially disposed within the interior volume, the rotor comprising:
a hub; and
two or more shoes, each pivotally coupled to the hub and extending between a first end and a second end that is farther from the hub than is the first end;
wherein each of the shoes is rotatable relative to the hub between a first position in which the second end of the shoe contacts at least one of the arcuate contact surface(s) of the stator and a second position in which the second end of the shoe does not contact the arcuate contact surface(s) of the stator; and wherein the hub includes two or more first stops, and each of the shoes contacts a respective one of the first stops when the shoe is in the first position;

wherein, when each of the shoes is in the first position, the shoes restrict rotation of the rotor relative to the stator in a first direction through contact with the arcuate contact surface(s) of the stator and the first stops of the hub; and wherein rotation of the rotor relative to the stator in a second direction that is opposite to the first direction urges each of the shoes toward the second position.

8. The anti-reverse rotation apparatus of claim 7, wherein:
each of the shoes is biased toward the first position; and
optionally, the rotor comprises two or more springs, each disposed between the hub and a respective one of the shoes to bias the shoe toward the first position.

9. The anti-reverse rotation apparatus of claim 8, wherein, for each of the shoes, a portion of the shoe that contacts the respective first stop is disposed closer to a longitudinal axis of the hub than is an axis of rotation of the shoe relative to the hub.

10. The anti-reverse rotation apparatus of claim 7, wherein:
the hub defines two or more recesses;
each of the shoes is partially disposed within a respective one of the recesses; and
optionally, each of the recesses defines a respective one of the first stops.

11. The anti-reverse rotation apparatus of claim 7, wherein:
the hub includes two or more second stops; and
each of the shoes contacts a respective one of the second stops when the shoe is in the second position.

12. The anti-reverse rotation apparatus of claim 7, wherein each of the shoes is pivotally coupled to the hub by a respective pin.

13. The anti-reverse rotation apparatus of claim 12, wherein, for each of the shoes:
one of the shoe and the hub defines a respective slot; and
the respective pin is received within the respective slot such that the shoe is radially-translatable relative to the hub.

14. The anti-reverse rotation apparatus of claim 13, wherein, for each of the shoes, as the shoe moves from the first position and toward the second position, the respective slot moves radially outwardly relative to the respective pin.

15. A method comprising:
rotating a rotor relative to and within a stator, the rotor having:
a hub including two or more first stops; and
two or more shoes, each pivotally coupled to the hub and extending between a first end and a second end that is farther from the hub than is the first end;

wherein the rotating is performed such that each of the shoes rotates relative to the hub:
from a first position in which the shoe is in contact with at least a portion of a respective one of the first stops and the second end of the shoe is in contact with the stator; and
toward a second position in which the shoe does not contact the portion of the respective first stop and the second end of the shoe does not contact the stator.

16. The method of claim 15, wherein:
each of the shoes is biased toward the first position, and
optionally, the rotor comprises two or more springs, each disposed between the hub and a respective one of the shoes to bias the shoe toward the first position.

17. The method of claim 15, wherein:
the hub defines two or more recesses;
each of the shoes is partially disposed within a respective one of the recesses;
optionally, each of the recesses defines a respective one of the first stops;
the hub includes two or more second stops;
each of the shoes contacts a respective one of the second stops when the shoe is in the second position; and
each of the recesses defines a respective one of the second stops.

18. The method of claim 15, wherein the center of gravity of each of the shoes is circumferentially offset in the direction of rotation of the rotor relative to the stator from an axis of rotation of the shoe relative to the hub.

19. The method of claim 15, wherein, for each of the shoes:
a first radial distance from an axis of rotation of the shoe relative to the hub to an outermost surface of the second end of the shoe is at least 4 times a second radial distance from the axis to an outermost surface of the first end of the shoe; and
the first and second radial distances are measured when the shoe is in the second position.

20. The method of claim 15, wherein:
the stator includes an annular groove having an outer face and an opposing inner face; and
each of the shoes includes:
a plate that extends between the first and second ends of the shoe; and
a protrusion that extends outwardly from the plate at the second end and is received by the groove;
wherein the protrusion contacts at least one of the outer face and the inner face of the groove when the shoe is in the first position.

* * * * *